US007756715B2

(12) United States Patent
Kim et al.

(10) Patent No.: US 7,756,715 B2
(45) Date of Patent: Jul. 13, 2010

(54) APPARATUS, METHOD, AND MEDIUM FOR PROCESSING AUDIO SIGNAL USING CORRELATION BETWEEN BANDS

(75) Inventors: Junghoe Kim, Seoul (KR); Dohyung Kim, Hwaseong-si (KR); Sihwa Lee, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1130 days.

(21) Appl. No.: 11/280,196

(22) Filed: Nov. 17, 2005

(65) Prior Publication Data

US 2006/0116871 A1 Jun. 1, 2006

(30) Foreign Application Priority Data

Dec. 1, 2004 (KR) ...................... 10-2004-0099742

(51) Int. Cl.
*G10L 19/00* (2006.01)
*G10L 21/02* (2006.01)
*G10L 13/00* (2006.01)
*G10L 13/06* (2006.01)
*G10L 15/00* (2006.01)

(52) U.S. Cl. ....................... 704/501; 704/216; 704/217; 704/218; 704/226; 704/230; 704/258; 704/263; 704/237

(58) Field of Classification Search ................. 704/200, 704/201, 205, 206, 207, 216, 217, 218, 237, 704/258, 263, 501, 226, 230
See application file for complete search history.

(56) References Cited

U.S. PATENT DOCUMENTS 5,692,102 A * 11/1997 Pan ............................ 704/230
6,108,625 A * 8/2000 Kim ........................... 704/229
6,978,236 B1 * 12/2005 Liljeryd et al. .............. 704/219
7,328,162 B2 * 2/2008 Liljeryd et al. .............. 704/503
7,376,554 B2 * 5/2008 Ojala et al. ................. 704/207

(Continued)

FOREIGN PATENT DOCUMENTS

EP 1 441 330 A2 7/2004

(Continued)

OTHER PUBLICATIONS

Schulz D., "Improving Audio Codecs by Noise Substituion," 1996, pp. 593-598, JAES, vol. 44, No. 7/8.*

(Continued)

*Primary Examiner*—David R Hudspeth
*Assistant Examiner*—Edgar Guerra-Erazo
(74) *Attorney, Agent, or Firm*—Staas & Halsey LLP

(57) ABSTRACT

Apparatus, method, and medium for processing an audio signal using a correlation between bands are provided. The apparatus includes an encoding unit encoding an input audio signal and a decoding unit decoding the encoded input audio signal. The encoding unit includes a correlation analyzer searching a most subband having a correlation of more than a predetermined value between a first subband and the most similar subband in each of the first subbands from second subbands and generating information about the second searched subband, and the decoding unit comprises a high frequency component restoring portion copying data about the second searched subband as data about the first subband, using the generated information about the second subband generated by the correlation analyzer and transmitted in a bit stream format, to perform decoding on the first subbands, and the first subbands are subbands that belong to a high frequency band in a band of a result of subband-filtering the input audio signal and the second subbands are subbands that belong to a low frequency band in a band of the result of subband-filtering.

23 Claims, 10 Drawing Sheets

U.S. PATENT DOCUMENTS

| | | | | |
|---|---|---|---|---|
| 2003/0093264 | A1 * | 5/2003 | Miyasaka et al. | 704/205 |
| 2003/0233236 | A1 * | 12/2003 | Davidson et al. | 704/258 |
| 2007/0036360 | A1 * | 2/2007 | Breebaart | 381/23 |
| 2007/0067162 | A1 * | 3/2007 | Villemoes et al. | 704/206 |

FOREIGN PATENT DOCUMENTS

| | | |
|---|---|---|
| EP | 1 441 330 A3 | 4/2005 |
| KR | 10-2004-0073281 | 8/2004 |
| WO | WO 03/090208 | 10/2003 |
| WO | 2005/076260 | 8/2005 |

OTHER PUBLICATIONS

J. Breebaart, S. van de Par, A. Kohlrausch, and E. Schuijers, "High-quality parametric spatial audio coding at low bitrates," in Proc. 116th AES Convention, Berlin, Germany, May 2004.*

E. Schuijers, J. Breebaart, H. Purnhagen, J. Engdegärd: "Low complexity parametric stereo coding", Proc. 116th AES convention, Berlin, Germany, 2004, Preprint 6073.*

E. Schuijers, W. Oomen, B. den Brinker, and J. Breebaart, "Advances in parametric coding for high-quality audio," in Proc. 114th AES Convention, Amsterdam, The Netherlands, Mar. 2003, Preprint 5852.*

Extended European Search Report issued on Mar. 23, 2006, in European Patent Application No. 05257270.8-2218.

Korean Office Action issued Apr. 28, 2006, in Korean Patent Application No. 10-2004-0099742.

European Search Report dated Jun. 19, 2009 issued in European Patent Application No. 05 257 270.8-2225.

* cited by examiner

APPARATUS, METHOD, AND MEDIUM FOR PROCESSING AUDIO SIGNAL USING CORRELATION BETWEEN BANDS

CROSS-REFERENCE TO RELATED APPLICATIONS

This application claims the benefit of Korean Patent Application No. 10-2004-0099742, filed on Dec. 1, 2004, in the Korean Intellectual Property Office, the disclosure of which is incorporated herein in its entirety by reference.

BACKGROUND OF THE INVENTION

1. Field of the Invention

The present invention relates to audio signal processing using, for example, a moving picture expert group (MPEG)-4, that is, audio signal encoding and decoding, and more particularly, to an apparatus, method, and medium for processing an audio signal using a correlation between bands.

2. Description of the Related Art

In a conventional method of processing an audio signal, such as perceptual noise substitution (PNS) which is used as an MPEG-4 audio coding tool, an audio signal can be effectively processed at a low bit rate such as 64 kbps/stereo, but sound quality is degraded at a high bit rate. In the conventional method, in particular, when a transient audio signal is processed, sound quality is more degraded. In addition, in the conventional method, the audio signal is encoded by reducing an audio frequency bandwidth since the number of available bits is small. In this case, since the audio frequency bandwidth is reduced, sound quality is more degraded.

SUMMARY OF THE INVENTION

The present invention provides an apparatus for processing an audio signal using a correlation between bands in which an audio signal is effectively processed without reducing a bandwidth even at a low bit rate.

The present invention also provides a method of for processing an audio signal using a correlation between bands in which an audio signal is effectively processed without reducing a bandwidth even at a low bit rate.

According to an aspect of the present invention, there is provided an apparatus for processing an audio signal using a correlation between bands, the apparatus including: an encoding unit encoding an input audio signal; and a decoding unit decoding the encoded input audio signal; wherein the encoding unit comprises a correlation analyzer searching a most similar subband having a correlation of more than a predetermined value between first subband and the most similar subband in each of the first subbands from second subbands and generating information about the second searched subband, wherein the decoding unit comprises a high frequency component restoring portion copying data about the second searched subband as data about the first subband, using the generated information about the second subband generated by the correlation analyzer and transmitted in a bit stream format to perform decoding on the first subbands, and wherein the first subbands are subbands that belong to a high frequency band in a band of a result of subband-filtering the input audio signal and the second subbands are subbands that belong to a low frequency band in a band of the result of subband-filtering.

According to another aspect of the present invention, there is provided a method of processing an audio signal using a correlation between bands, the method including: when encoding an input audio signal, searching a most similar subband having a correlation of more than a predetermined value between the first subband and the most similar subband in each of the first subbands from second subbands and generating information about the second searched subband; and when decoding the encoded input audio signal, copying data about the second searched subband as data about the first subbands, using the generated information about the second generated subband transmitted in a bit stream format to perform decoding on the first subband, and wherein the first subbands are subbands that belong to a high frequency band in a band of a result of subband-filtering the input audio signal and the second subbands are subbands that belong to a low frequency band in a band of the result of subband-filtering.

At least one computer readable medium storing instructions that control at least one processor to perform a method of processing an audio signal using a correlation between bands, the method comprising: when encoding an input audio signal, searching a most similar subband having a correlation of more than a predetermined value between the first subband and the most similar subband in each of the first subbands from second subbands and generating information about the second searched subband; and when decoding the encoded input audio signal, copying data about the second searched subband as data about the first subbands, using the generated information about the second generated subband transmitted in a bit stream format to perform decoding on the first subband, and wherein the first subbands are subbands that belong to a high frequency band in a band of a result of subband-filtering the input audio signal and the second subbands are subbands that belong to a low frequency band in a band of the result of subband-filtering.

A method of processing an audio signal using a correlation between bands, the method comprising: encoding an input audio signal including searching second subbands for a most similar subband having a correlation of more than a predetermined value between the first subband and the most similar subband in each of the first subbands, and generating information about the most similar subband; and decoding the encoded input audio signal including copying data about the second searched subband as data about the first subbands, using the generated information about the second generated subband transmitted in a bit stream format to perform decoding on the first subband, wherein the first subbands are subbands that belong to a high frequency band, and the second subbands are subbands that belong to a low frequency band.

At least one computer readable medium storing instructions that control at least one processor to perform a method of processing an audio signal using a correlation between bands, the method comprising: encoding an input audio signal including searching second subbands for a most similar subband having a correlation of more than a predetermined value between the first subband and the most similar subband in each of the first subbands, and generating information about the most similar subband; and decoding the encoded input audio signal including copying data about the second searched subband as data about the first subbands, using the generated information about the second generated subband transmitted in a bit stream format to perform decoding on the first subband, wherein the first subbands are subbands that belong to a high frequency band, and the second subbands are subbands that belong to a low frequency band.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which.

DETAILED DESCRIPTION OF THE PREFERRED EMBODIMENTS

Figure 1:
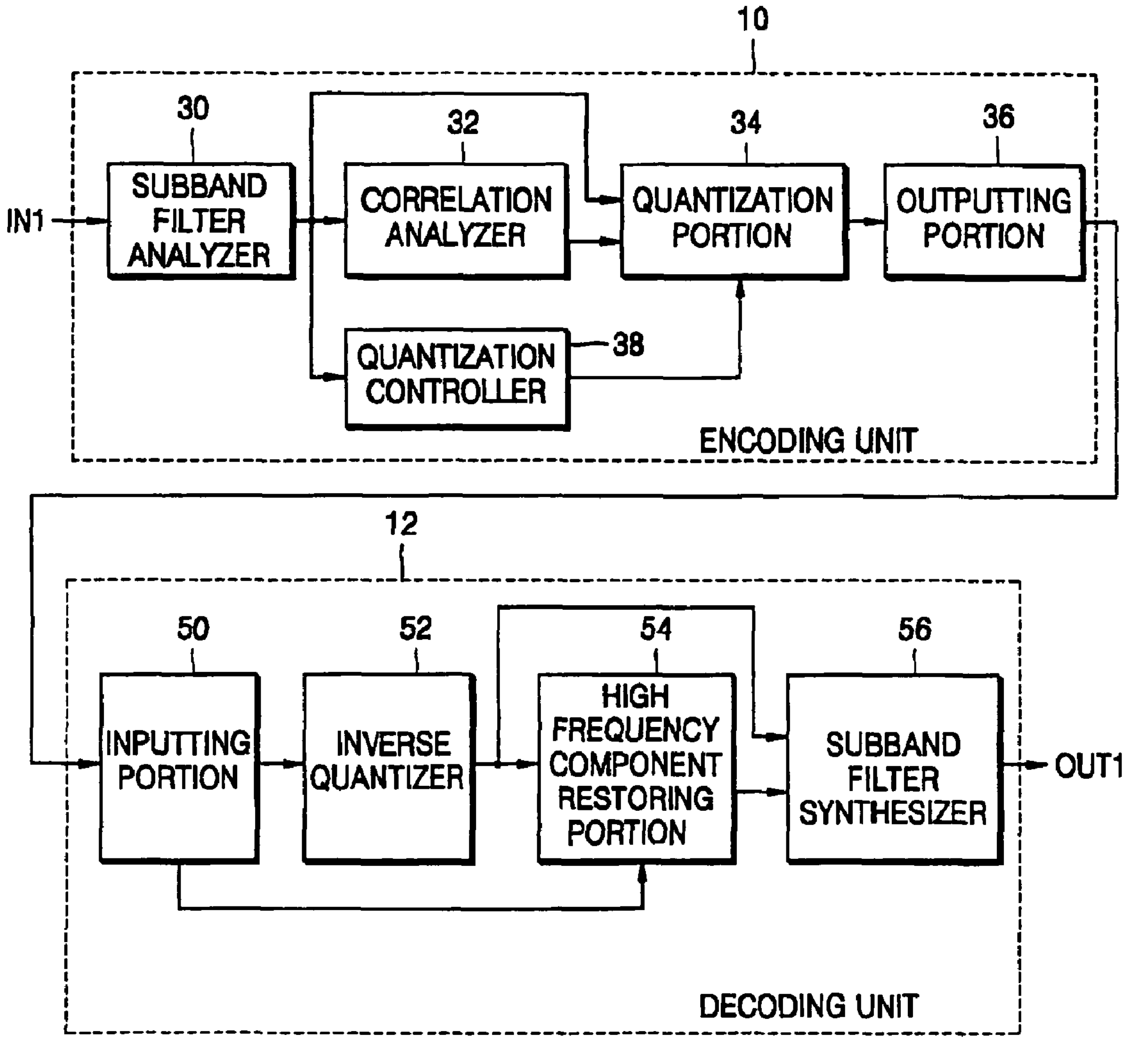
FIG. 1 is a block diagram of an apparatus for processing an audio signal according to an exemplary embodiment of the present invention.

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

FIG. 1 is a block diagram of an apparatus for processing an audio signal according to an exemplary embodiment of the present invention. The apparatus of FIG. 1 comprises an encoding unit 10 and a decoding unit 12.

The encoding unit 10 encodes an input audio signal input through an input terminal IN1 and transmits the result of encoding to the decoding unit 12. In this case, the decoding unit 12 decodes the input audio signal encoded by the encoding unit 10 and outputs the result of decoding through an output terminal OUT1.

In exemplary embodiments, subbands having a high frequency are referred to as first subbands, and subbands having a low frequency are referred to as second subbands.

When encoding, the encoding unit 10 searches the second subbands to obtain the most similar subband having a correlation, of more than a predetermined value, between the first subband and the most similar subband. Encoding unit 10 generates information about the second searched subband, for example, information about an index of the second searched subband, where the second searched subband is the most similar subband. The encoding unit 10 performs the operation on each of the first subbands.

In this case, the encoding unit 10 encodes an input audio signal using a general audio encoding method in first subband(s) having no similar subband(s) and second subbands. Hereinafter, similar subband refers to a second subband having a correlation of more than a predetermined value between the first subband and the similar subband. In this case, the general audio encoding method may be random noise substitution (RNS), which will be described later.

According to an exemplary embodiment of the present invention, the encoding unit 10 may comprise a subband filter analyzer 30, a correlation analyzer 32, a quantizer 34, an outputting portion 36, and a quantization controller 38, as shown in FIG. 1.

Hereinafter, the configuration and operation of the encoding unit 10 shown in FIG. 1 and a method of processing an audio signal performed in the encoding unit 10 will be described.

Figure 2:
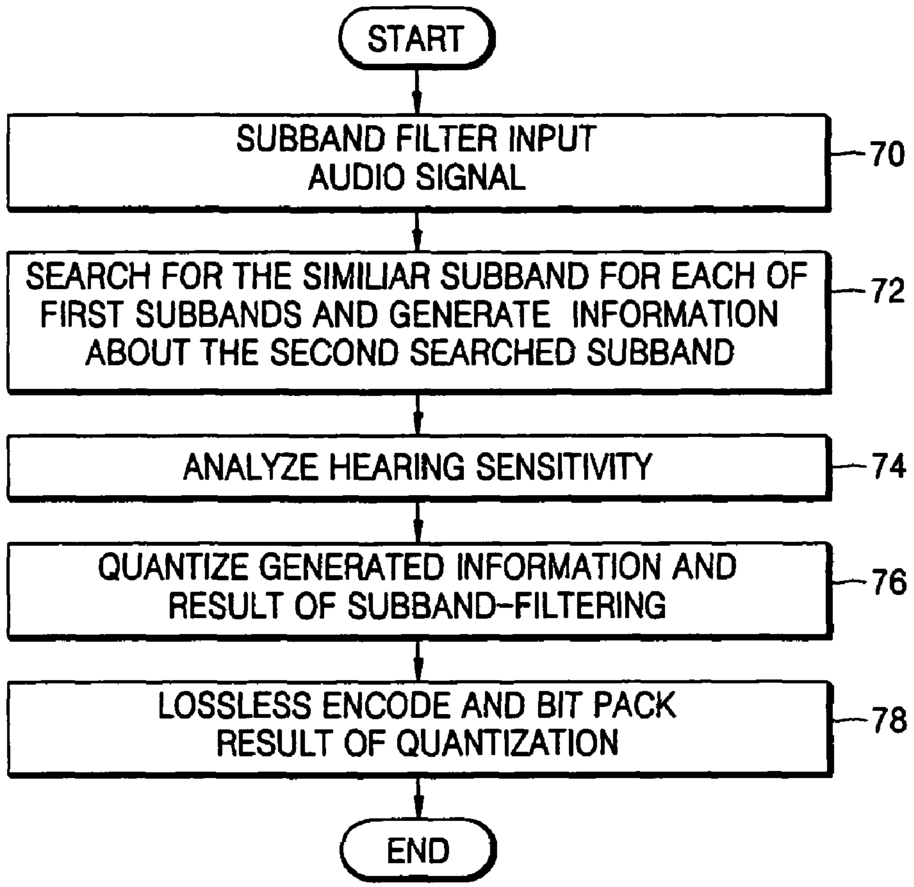
FIG. 2 is a flowchart illustrating a method of processing an audio signal by which an input audio signal is encoded, according to an exemplary embodiment of the present invention.

FIG. 2 is a flowchart illustrating a method of processing an audio signal by which an input audio signal is encoded, according to an exemplary embodiment of the present invention. The method of FIG. 2 includes subband-filtering an input audio signal (operation 70), searching for the most similar subband for each of first subbands included in the result of subband-filtering and generating information about the searched most similar subband (operation 72), performing quantization using the result of analyzing hearing sensitivity (operations 74 and 76), and lossless encoding and bit packing the result of quantization (operation 78).

In operation 70, the subband filter analyzer 30 of the encoding unit 10 inputs an input audio signal through an input terminal IN1, subband-filters the inputted input audio signal, and outputs the result of subband-filtering to each of the correlation analyzer 32 and the quantization controller 38. In this case, the subband filter analyzer 30 may also output the result of subband-filtering to the quantizer 34, which is also referred to as quantization portion 34.

After operation 70, in operation 72, the correlation analyzer 32 searches for the most similar subband, having a correlation of more than a predetermined value between the first subband and the most similar subband, from second subbands, generates information about the second searched subband, and outputs generated information to the quantizer 34. For example, the correlation analyzer 32 searches for the most similar subband from the second subbands and matches each first subband having a most similar subband with information about the most similar subband to generate information about the second searched subband.

After operation 72, in operation 74, the quantization controller 38 analyzes hearing sensitivity from the result of subband-filtering inputted by the subband filter analyzer 30, generates a step size control signal according to the result of analyzing, and outputs the generated step size control signal to the quantizer 34. To this end, the quantization controller 38 may be implemented as an address generator (not shown) and a lookup table (not shown). Here, the address generator (not shown) generates an address by reflecting heating sensitivity from the result of subband filtering inputted by the subband filter analyzer 30 and outputs the generated address to the lookup table (not shown). The lookup table selects a corresponding step size from step sizes stored as data, in response to the address generated by the address generator and outputs the selected step size as a step size control signal to the quantizer 34. Here, the step size stored in the lookup table may be generated based on information used to properly perform quantization, for example, a psychological sound model.

According to the present invention, operations 72 and 74 shown in FIG. 2 may be performed simultaneously, and operation 74 may be performed earlier than operation 71.

After operation 74, in operation 76, the quantizer 34 quantizes information about the second generated subband inputted by the correlation analyzer 32 and the result of subband-filtering and outputs the result of quantization to the outputting portion 36. To this end, the quantizer 34 may directly input the result of subband-filtering from the subband filter analyzer 30 or through the correlation analyzer 32. In this case, the quantizer 34 controls a quantization step size in response to the step size control signal inputted by the quantization controller 38.

After operation 76, in operation 78, the outputting portion 36 lossless encodes and bit packs the result of quantization performed by the quantizer 34, converts the result of lossless-encoding and bit-packing into a bit stream format, stores the converted bit stream, and transmits the stored bit stream to the decoding unit 12. Here, Huffman encoding may be used for lossless encoding.

According to the present invention, the encoding unit 10 may not comprise the quantization controller 38. In this case, the encoding unit 10 comprises a subband filter analyzer 30, a correlation analyzer 32, a quantizer 34, and an outputting portion 36.

When decoding, the decoding unit 12 receives information about the second generated subband in a bit stream format transmitted from the encoding unit 10 and copies data about the second searched subband as data about a first subband using received information.

In this case, an input audio signal having no matched most similar subband between a first subband(s) and second subbands, is decoded using a general audio decoding method. To this end, according to an exemplary embodiment of the present invention, the decoding unit 12 comprises an inputting portion 50, an inverse quantizer 52, a high frequency component restoring portion 54, and a subband filter synthesizer 56, as shown in FIG. 1.

Hereinafter, the configuration and operation of the decoding unit 12 shown in FIG. 1 and a method of processing an audio signal performed in the decoding unit 12 will be described.

Figure 3:
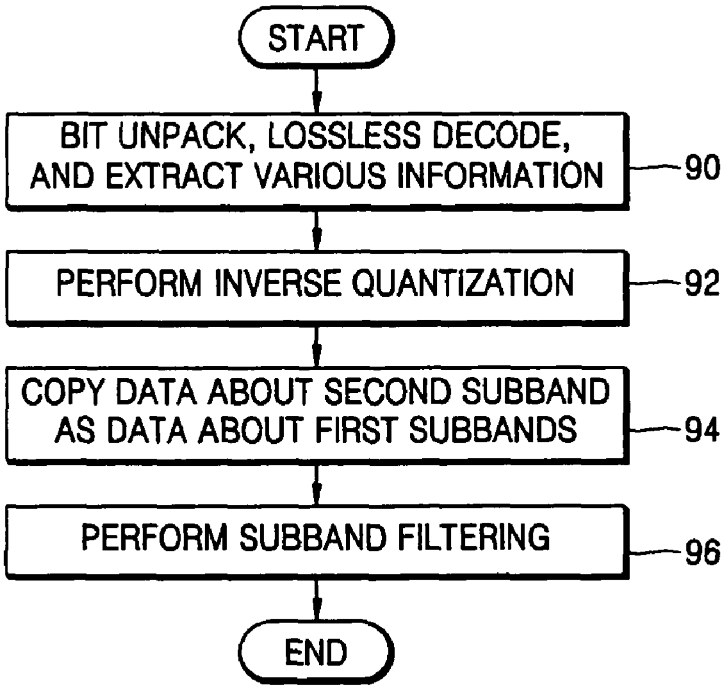
FIG. 3 is a flowchart illustrating a method of processing an audio signal by which an encoded audio signal is decoded, according to another exemplary embodiment of the present invention.

FIG. 3 is a flowchart illustrating a method of processing an audio signal by which an encoded audio signal is decoded, according to another exemplary embodiment of the present invention. The method of FIG. 3 includes bit unpacking, lossless decoding, and extracting various information (operation 90), performing inverse quantization (operation 92), copying data (operation 94), and performing subband filtering and restoring an input audio signal (operation 96).

In operation 90, the inputting portion 50 receives a bit stream transmitted from the outputting portion 36 of the encoding unit 10, bit unpacks and lossless decodes the received bit stream, outputs the bit-unpacked and lossless-decoded bit stream to the inverse quantizer 52, extracts various information and outputs extracted information to the high frequency component restoring portion 54. Here, Huffman decoding is an example of lossless decoding.

After operation 90, in operation 92, the inverse quantizer 52 inputs and inverse quantizes the result of lossless decoding performed by the inputting portion 50 and outputs the result of inverse quantization to the high frequency component restoring portion 54.

After operation 92, in operation 94, the high frequency component restoring portion 54 copies data corresponding to information about the second generated subband included in various information extracted by the inputting portion 50 among data about second subbands included in the result of inverse quantization as data about the first subband and outputs the result of copying to the subband filter synthesizer 56.

After operation 94, in operation 96, the subband filter synthesizer 56 subband filters the first subband having copied data inputted by the high frequency component restoring portion 54 and the result of inverse quantization and outputs the result of subband-filtering as an audio signal in which the input audio signal is restored, through an output terminal OUT1. The result of inverse quantization subband-filtered in operation 96 refers to data about the first subband having no copied data and the second subband among data included in the result of inverse quantization.

To this end, the subband filter synthesizer 56 may input the result of inverse quantization through the high frequency component restoring portion 54 or directly from the inverse quantizer 52.

Hereinafter, the configuration and operation of the correlation analyzer 32 shown in FIG. 1 according to exemplary embodiments of the present invention and a method of processing an audio signal performed in exemplary embodiments will be described with reference to the attached drawings.

Figure 4:
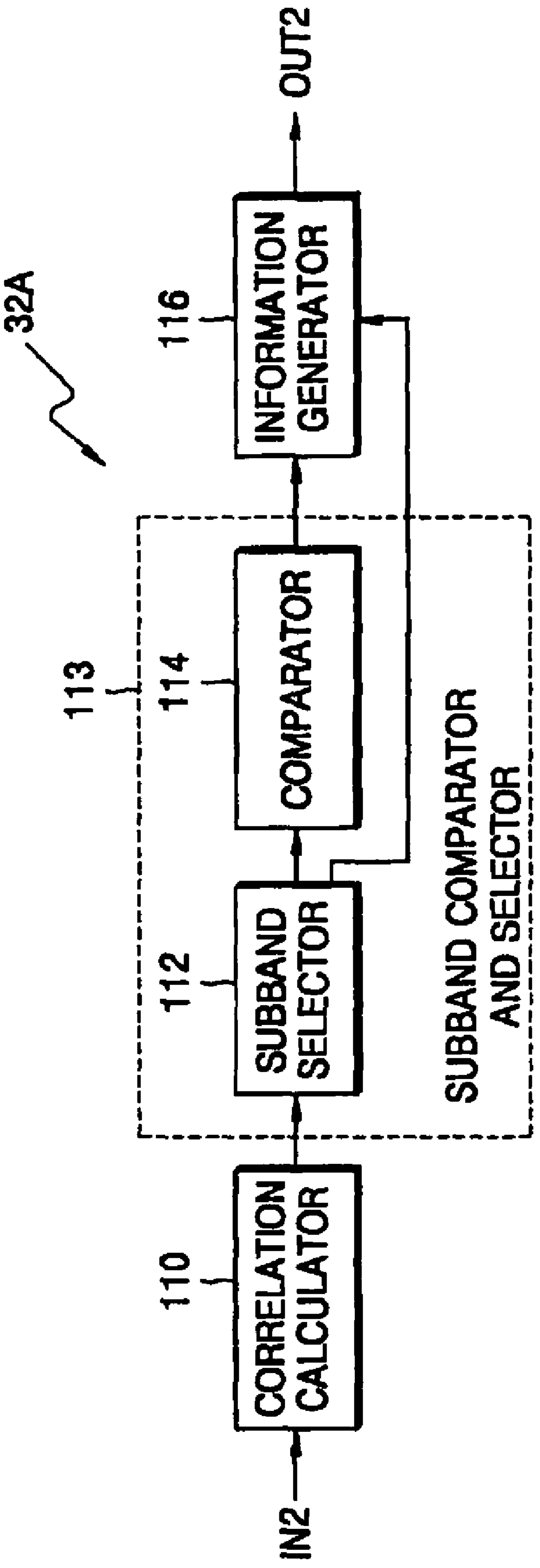
FIG. 4 is a block diagram of a correlation analyzer shown in FIG. 1 according to another exemplary embodiment of the present invention.

FIG. 4 is a block diagram of the correlation analyzer 32 shown in FIG. 1 according to another exemplary embodiment 32A of the present invention. The correlation analyzer 32A comprises a correlation calculator 110, a subband comparator and selector 113, and an information generator 116.

Figure 5:
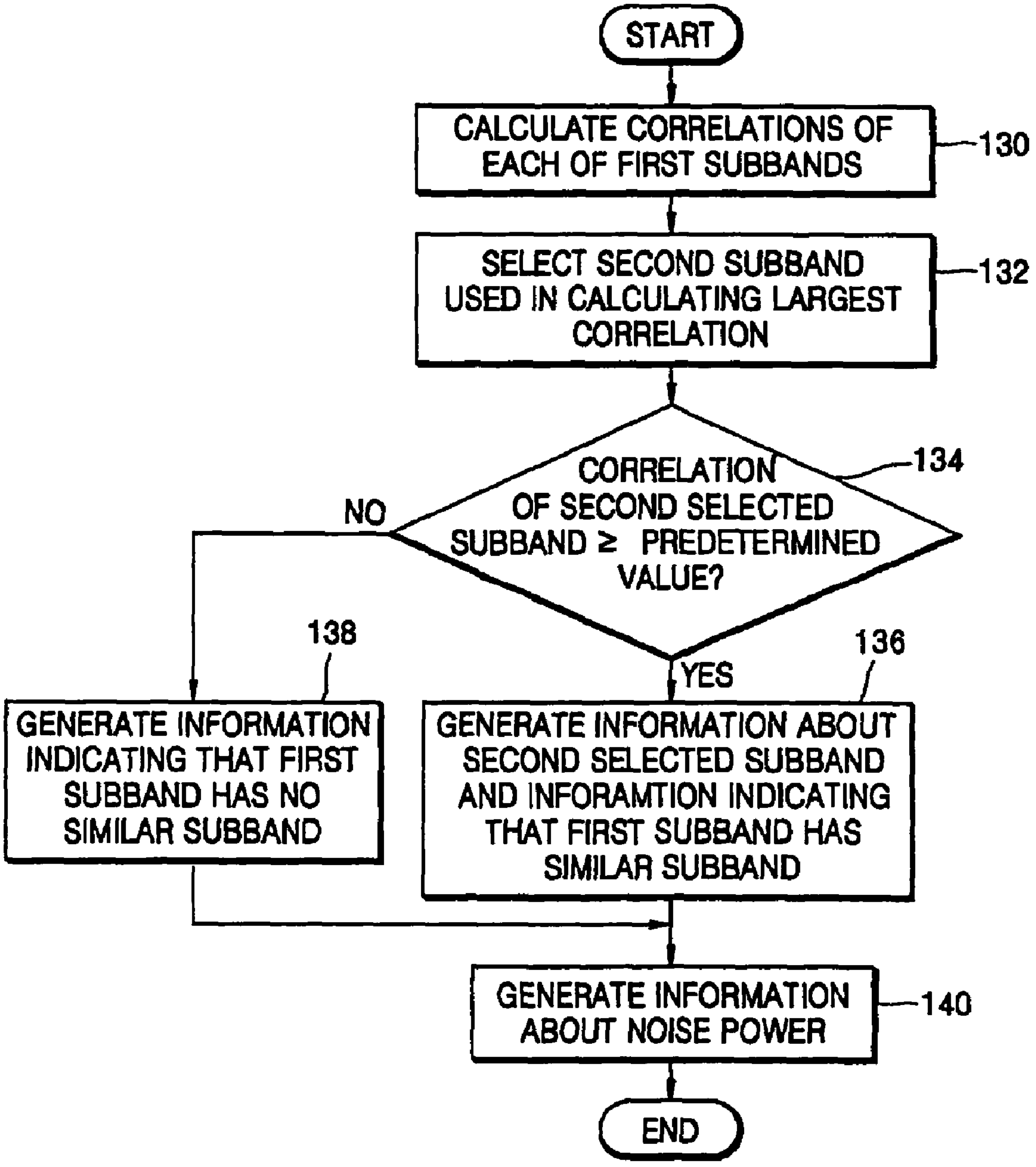
FIG. 5 is a flowchart illustrating operation 72 shown in FIG. 2 according to another exemplary embodiment of the present invention.

FIG. 5 is a flowchart illustrating operation 72 shown in FIG. 2 according to another exemplary embodiment of the present invention. Operation 72 includes selecting second subbands used in obtaining the largest correlation among correlations between respective first subbands and the second subbands (operations 130 and 132), generating information according to similarity of correlations (operations 134 and 138), and generating information about a noise power (operation 140).

In operation 130, the correlation calculator 110 of FIG. 4 calculates correlations between second subbands that belong to a low frequency band, and each of the first subbands that belongs to a high frequency band and outputs the calculated correlations in each of the first subbands to the subband comparator and selector 113. To this end, the correlation calculator 110 discriminates a high frequency band and a low frequency band based on a reference frequency in a band of the result of subband-filtering inputted through an input terminal IN2. According to the present invention, the reference frequency which is a basis for discriminating a high frequency band and a low frequency, may be changed by a user or may be set in advance.

According to the present invention, a correlation can be obtained using Equation 1

$$cor = \frac{\mathrm{abs}\left(\sum_{i=0}^{l-1}(samp[sb_1][i]\cdot samp[sb_2][i])\right)}{\sqrt{\sum_{i=0}^{l-1}(samp[sb_1][i]\cdot samp[sb_1][i])\sum_{i=0}^{l-1}(samp[sb_2][i]\cdot samp[sb_2][i])}}, \quad (1)$$

wherein abs( ) is an absolute value of ( ), $sb_1$ is an index of a second subband that belongs to a low frequency band and is one selected from 0 to k−1. In addition, k is the number of second subbands that belong to the low frequency band, and $sb_2$ is an index of a first subband. I is the number of time domain samples which belong to the first subband. In this case, it is assumed that the number of time domain samples that belong to the first subbands is equal to that of the second subbands. In addition, samp[$sb_1$][i] is an i-th time domain sample placed in an $sb_1$-th second subband, and samp[$sb_2$][i] is an i-th time domain sample placed in an $sb_2$-th first subband.

After operation 130, in operations 132 and 134, a subband selector 112 selects second subbands used in calculating the largest correlation of more than a predetermined value among correlations calculated in each of first subbands and inputted by the correlation calculator 110 and outputs the second selected subbands to the information generator 116. Here, 'the second subbands used in calculating correlations' refers to second subbands compared with first subbands to calculate correlations.

To this end, in operation 132, the subband selector 112 selects second subbands used in calculating the largest correlation of more than a predetermined value among correlations calculated by the correlation calculator 110 in each of first subbands, outputs the second selected subbands to the information generator 116, and outputs the largest correlation to a comparator 114. After operation 132, in operation 134, the comparator 114 compares a correlation calculated using the second subbands selected in each of first subbands, that is, the largest correlation in each of first subbands, with a predetermined value and outputs the result of comparing to the information generator 116. In other words, the comparator 114 determines whether the largest correlation of each of the first subbands is more than or equal to the predetermined value.

In operations 136 to 140, the information generator 116 generates information about the second selected subband inputted from the subband selector 112, information about whether first subbands have similar subbands, and information about a noise power of the first subbands and outputs the generated information through an output terminal OUT2 in response to the result compared by the comparator 114.

For example, if it is recognized from the result of comparing inputted by the comparator 114 that the largest correlation of the first subbands is more than or equal to the predetermined value, in operation 136, the information generator 116 generates information about the second selected subbands inputted from the subband selector 112, that is, information about an index of the second selected subbands and information indicating that the first subbands have similar subbands, for example, in a mode bit format, and outputs the generated information through an output terminal OUT2. However, if it is recognized from the result of comparing inputted from the comparator 114 that the largest correlation of the first subband is not more than the predetermined value, in operation 138, the information generator 116 generates information indicating that the first subband has no similar subbands, in a mode bit format. Here, the mode bit is a bit indicating whether the first subband has similar subband. For example, if the first subbands have the similar subbands, in operation 136, the mode bit may be set to '1' (or '0') to indicate a correlation noise substitution (CNS) mode. If the first subbands have no similar subbands, in operation 138, the mode bit may be set to '0' (or '1') to indicate a random noise substitution (RNS) mode. Operations 136 and 138 are performed on each first subblock.

Figure 6:
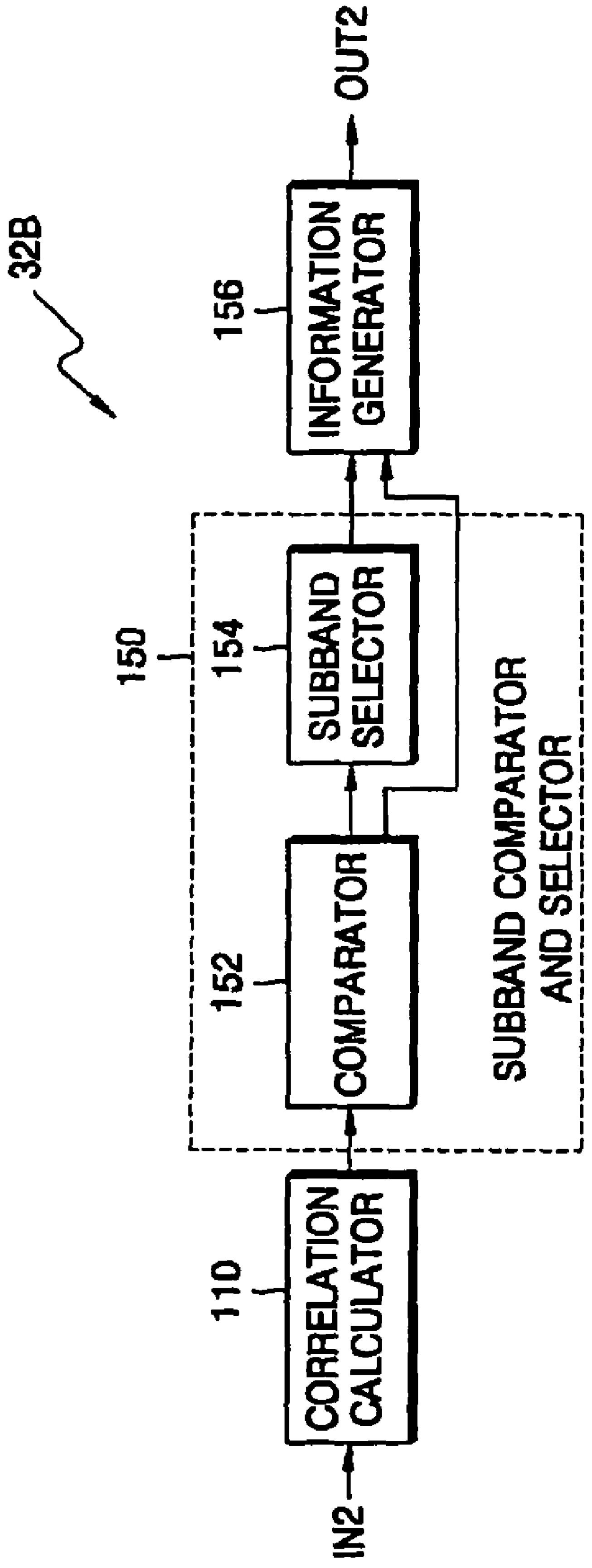
FIG. 6 is a block diagram of the correlation analyzer shown in FIG. 1 according to another exemplary embodiment of the present invention.

FIG. 6 is a block diagram of the correlation analyzer 32 shown in FIG. 1 according to another exemplary embodiment 32B of the present invention. The correlation analyzer 32B comprises a correlation calculator 110, a subband comparator and selector 150, and an information generator 156.

Figure 7:
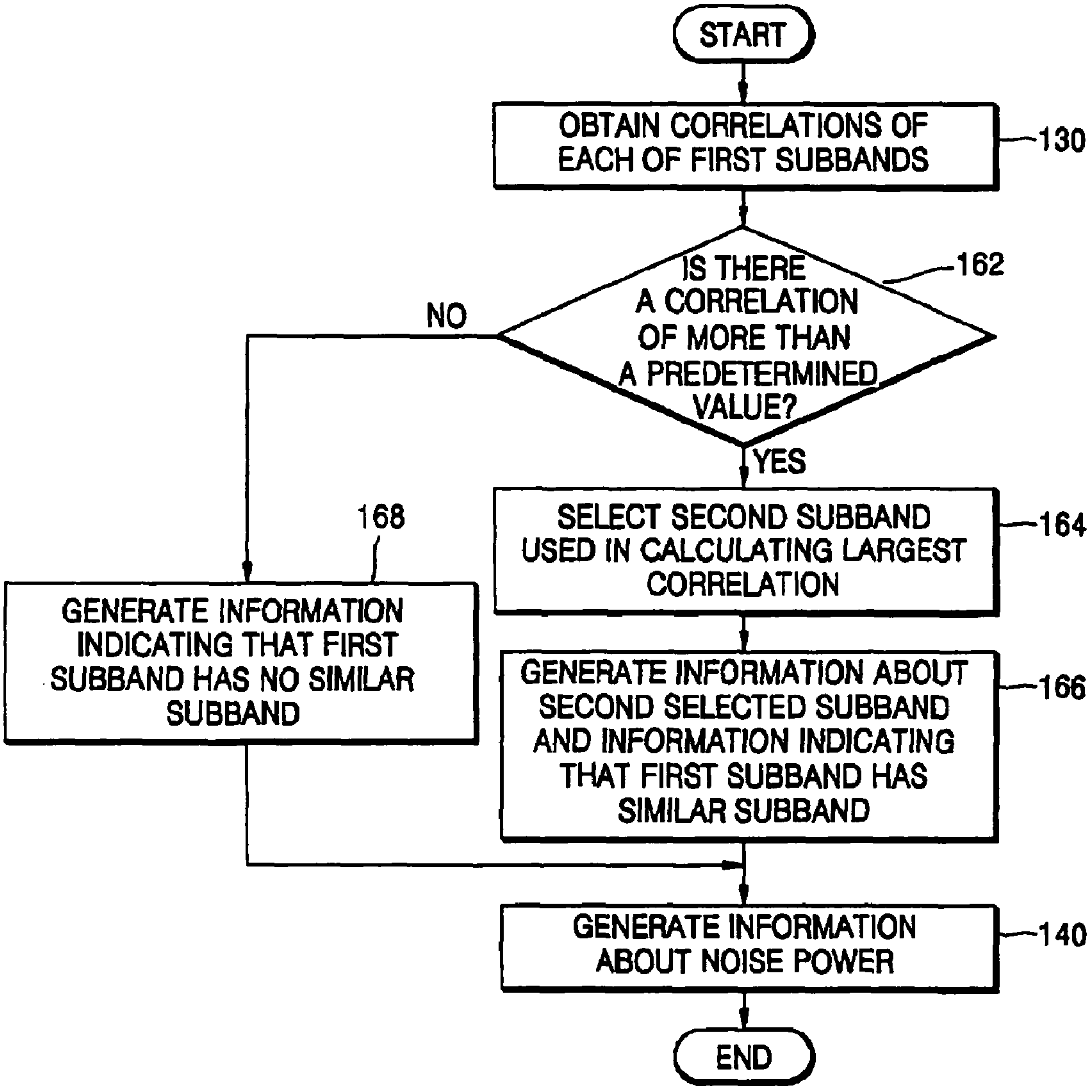
FIG. 7 is a flowchart illustrating operation 72 shown in FIG. 2 according to another exemplary embodiment of the present invention.

FIG. 7 is a flowchart illustrating operation 72 shown in FIG. 2 according to another exemplary embodiment of the present invention. Operation 72 includes determining whether there are correlations of more than a predetermined value among correlations of respective first subbands (operations 130 and 162), selecting second subbands used in obtaining the largest correlation from the existing correlations (operation 164), and generating information (operations 136 to 140).

Since the correlation calculator 110 shown in FIGS. 4 and 6 performs the same operation, the same reference numeral is used therefor, and a detailed description thereof will be omitted. Further, since operations 130 and 140 shown in FIGS. 5 and 7 are performed in the same manner, the same reference numeral is used therefor, and a detailed description thereof will be omitted.

After operation 130, in operations 162 and 164, the subband comparator and selector 150 selects second subbands used in calculating the largest correlation of more than a predetermined value among correlations calculated in each of first subbands and inputted from the correlation calculator 110 and outputs the second selected subbands to the information generator 156.

To this end, in operation 162, a comparator 152 compares the correlations calculated in each of first subbands with the predetermined value and outputs the result of comparing to each of a subband selector 154 and an information generator 156. In other words, the comparator 152 determines whether there is correlation of more than the predetermined value among correlations calculated in each of subbands. If it is recognized from the result compared by the comparator 152 that there is correlation of more than the predetermined value, in operation 164, the subband selector 154 selects second subbands used in calculating the largest correlation among the correlations of more than the predetermined value and outputs the second selected subbands to the information generator 156.

In operations 166 and 168, the information generator 156 generates information about the second subbands selected by the subband selector 154, generates information about whether the first subband has similar subband, using the result of comparing inputted from the comparator 152, and outputs the generated information through an output terminal OUT2. The information generator 156 also generates information about a noise power of the first subband, like the information generator 116 shown in FIG. 4.

For example, if it is recognized from the result of comparing inputted from the comparator 152 that there is correlation of more than the predetermined value, in operation 166, the information generator 156 generates information about the second selected subband inputted from the subband selector 154, that is, information about an index of the second selected subband and information indicating that the first subband has similar subband, for example, in a mode bit format, and outputs the generated information through an output terminal OUT2. However, if it is recognized from the result of comparing inputted from the comparator 152 that there is no correlation of more than the predetermined value, in operation 168, the information generator 156 generates information indicating that the first subband has no similar subband, in the mode bit format. Operations 166 and 168 are performed on each first subblock.

Hereinafter, the configuration and operation of the high frequency component restoring portion 54 shown in FIG. 1 according to an exemplary embodiment of the present invention and a method of processing an audio signal performed in an exemplary embodiment will be described with reference to the attached drawings.

Figure 8:
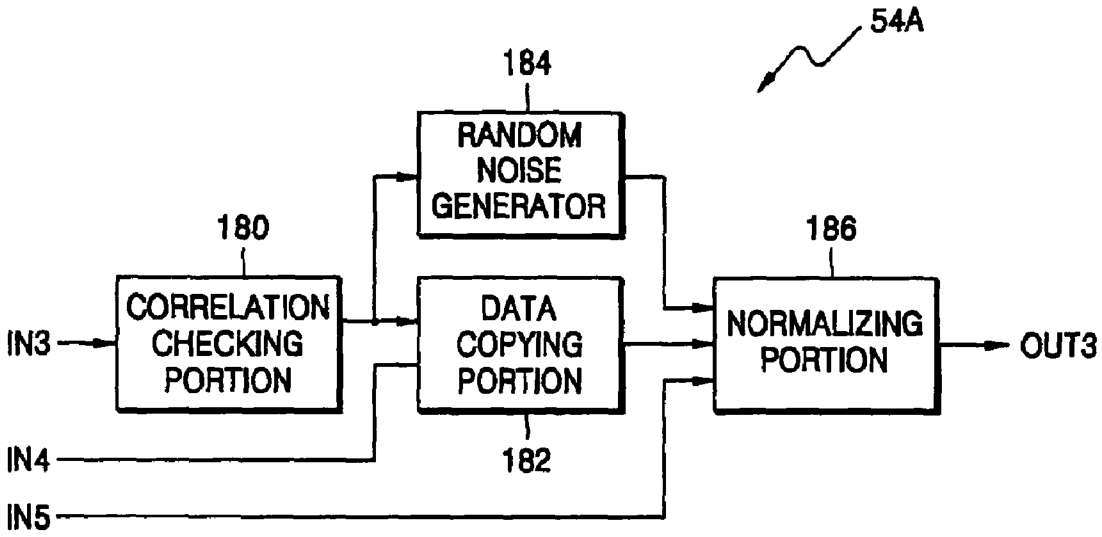
FIG. 8 is a block diagram of a high frequency component restoring portion according to another exemplary embodiment of the present invention.

FIG. 8 is a block diagram of the high frequency component restoring portion 54 according to another exemplary embodiment 54A of the present invention. The high frequency component restoring portion 54A includes a correlation checking portion 180, a data copying portion 182, a random noise generator 184, and a normalizing portion 186.

Figure 9:
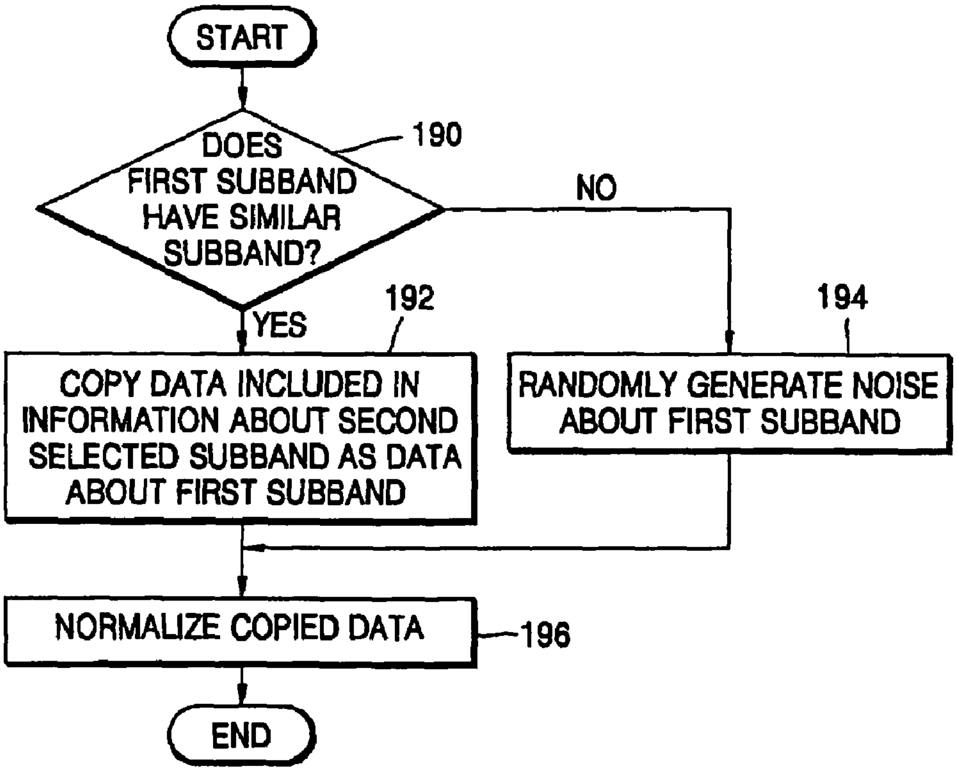
FIG. 9 is a flowchart illustrating operation 94 shown in FIG. 3 according to another exemplary embodiment of the present invention.

FIG. 9 is a flowchart illustrating operation 94 shown in FIG. 3 according to another exemplary embodiment of the present invention. Operation 94 includes decoding first subbands differently depending on whether the first subband has similar subband (operations 190 to 194) and normalizing copied data (operation 196).

In operation 190, the correlation checking portion 180 checks whether each of first subbands of the result of quantization performed by the inverse quantization portion 52 has similar subband. To this end, the correlation checking portion 180 inputs additional information extracted from the inputting portion 50 through an input terminal IN3 and determines from the inputted additional information whether each of the first subbands has similar subbands. For example, the extracted additional information may include the above-described mode bit. In this case, the correlation checking portion 180 checks whether the mode bit is '1' or '0' and can determine through the result of checking whether the first subband has the similar subband.

If it is recognized through the result of checking performed by the correlation checking portion 180 that the first subbands has the similar subband, in operation 192, the data copying portion 182 extracts data included in information about the second selected subbands from the result of inverse quantization inputted from the inverse quantization portion 52 through an input terminal IN4 and copies the extracted data as data about the first subbands. However, if it is recognized through the result of checking performed by the correlation checking portion 180 that the first subbands have no similar subbands, in operation 194, the random noise generator 184 randomly generates noise about the first subbands and outputs the randomly-generated noise to the normalizing portion 186. Here, the above-described RNS method includes a general encoding method by which operation 138 or 168 of setting the mode bit to a bit value indicating an RNS mode is performed and a general decoding method by which operation 194 is performed according to the mode bit set to the bit value indicating the RNS mode.

Operations 192 and 194 shown in FIG. 9 are performed on each of first subbands. In this case, decoding on the second subbands is performed using a general decoding method. In other words, noise of the second subbands is randomly generated in operation 194.

After operation 192 or 194, the normalizing portion 186 normalizes the copied data and the randomly-generated noise so that a total noise power about first subbands, that is, a total energy is maintained at the same level as that of the first subbands calculated from the encoding unit 10, and outputs the result of normalization to the subband filter synthesizer 56 through an output terminal OUT3. To this end, the normalizing portion 186 inputs additional information including information about the noise power generated by the encoding unit 10 from the inputting portion 50 through an input terminal IN5, so as to see a total noise power of the first subbands calculated from the encoding unit 10.

Here, when data included in the information about the second selected subband is copied as data about the first subbands, the level of the first original subband may be changed. Thus, in order to restore the level of the first original subbands before encoding, the normalizing portion 186 normalizes the copied data and the randomly-generated noise.

In the apparatus and method for processing an audio signal according to the present invention, when a correlation between a low frequency band and a high frequency band is high, a more improved performance can be provided to the user.

In general, the correlation between the low frequency band and the high frequency band increases when a sudden attack occurs on a time region and even when a harmonic component is strong and identical with a subband boundary.

Figure 10A:
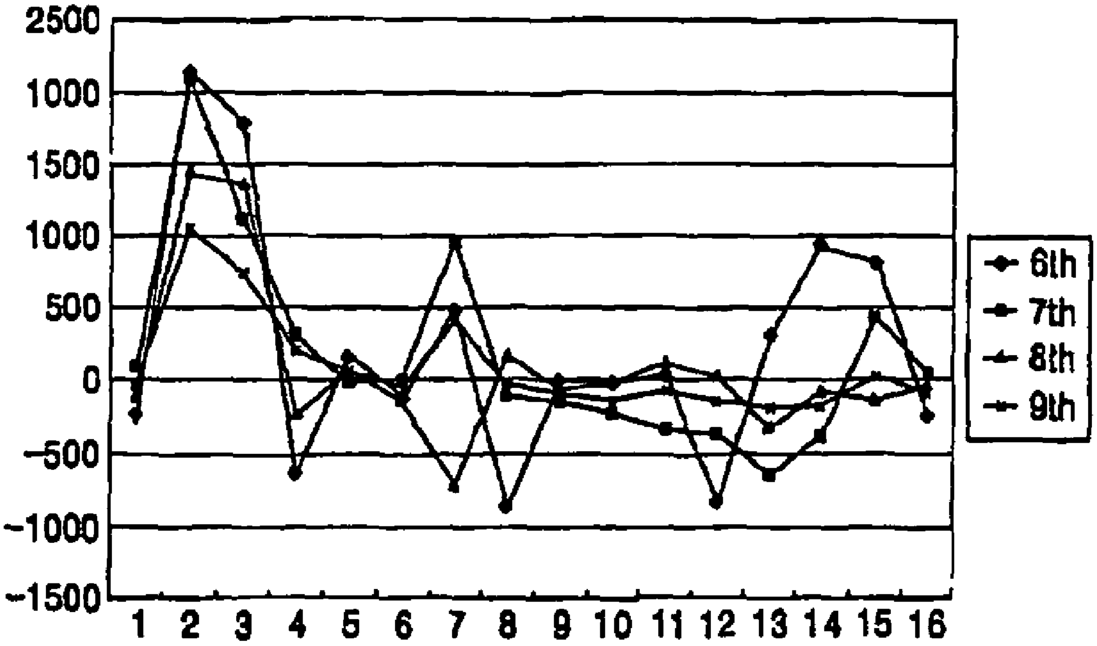
FIGS. 10A through 10E are illustrative waveforms of subbands for explaining a correlation between a low frequency band and a high frequency band.
Figure 10B:
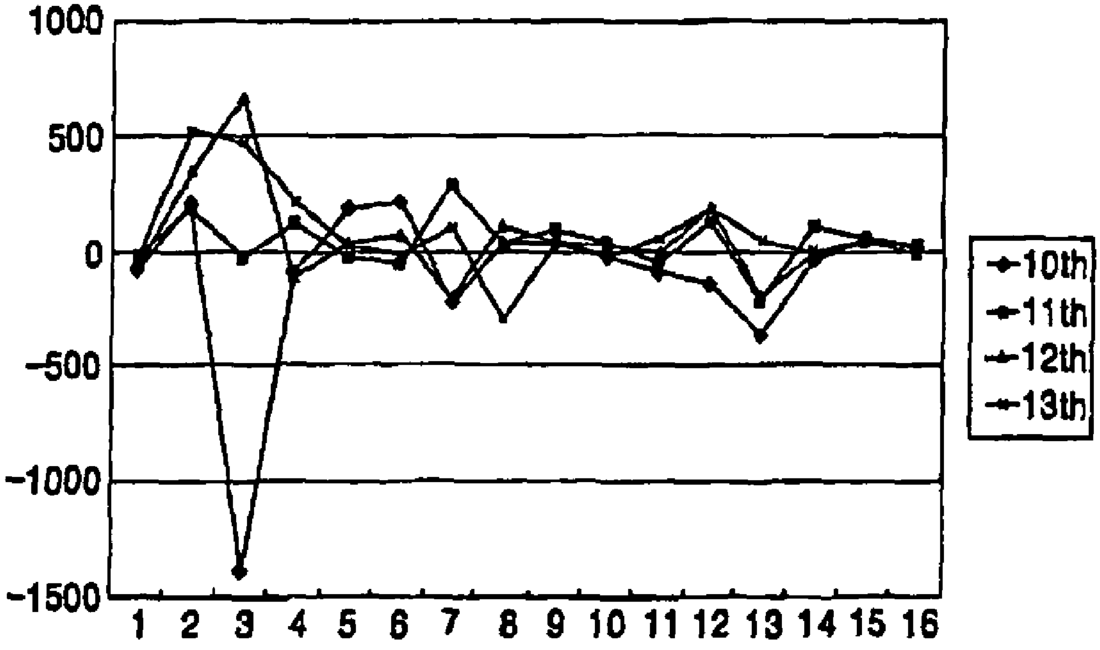
Figure 10C:
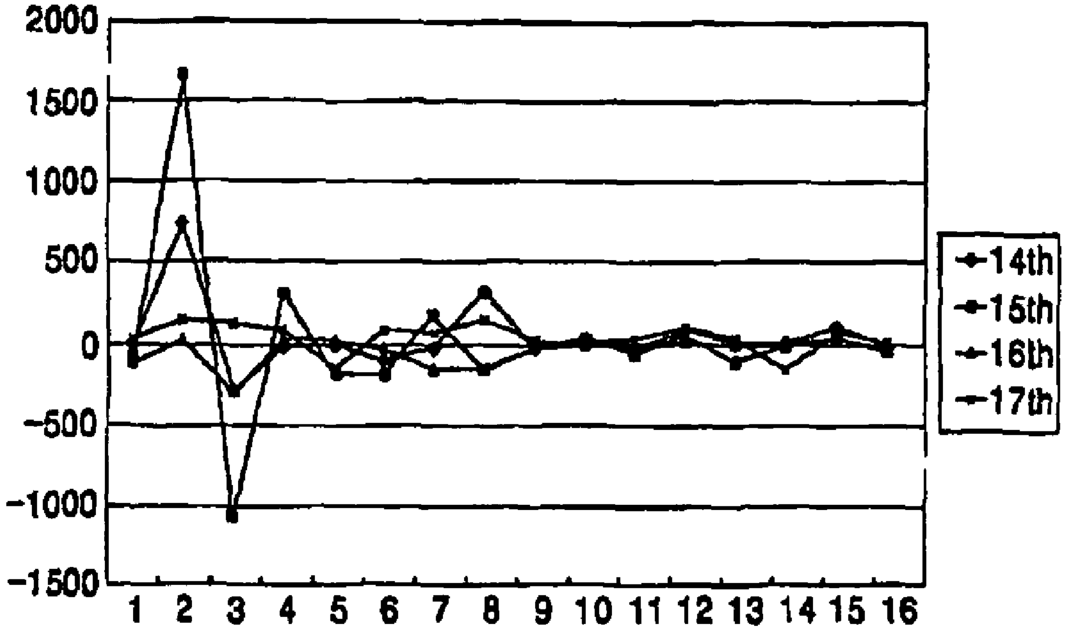
Figure 10D:
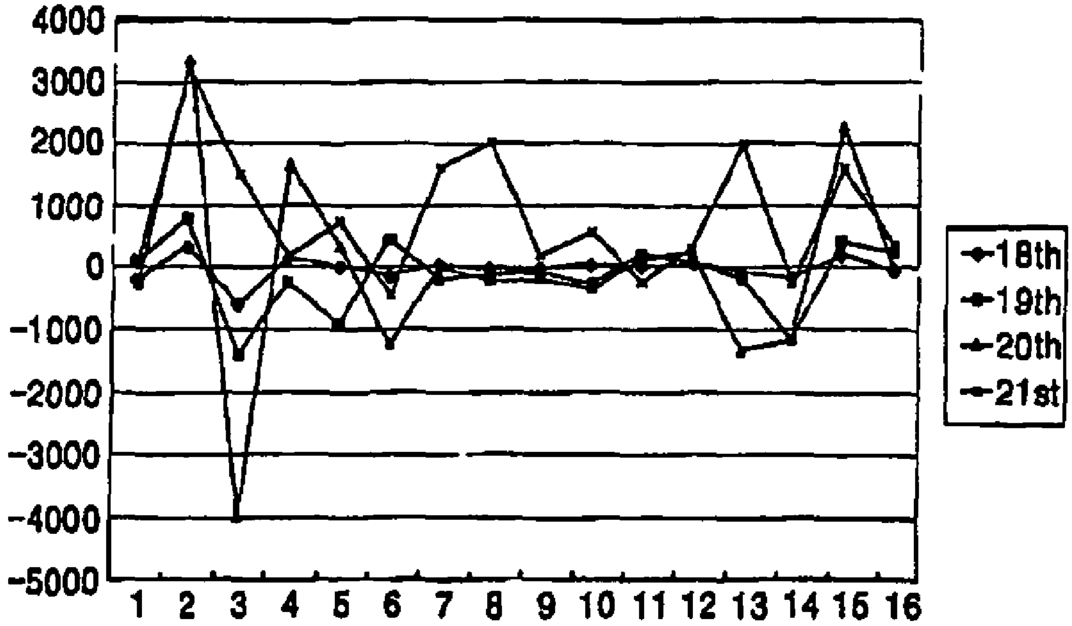
Figure 10E:
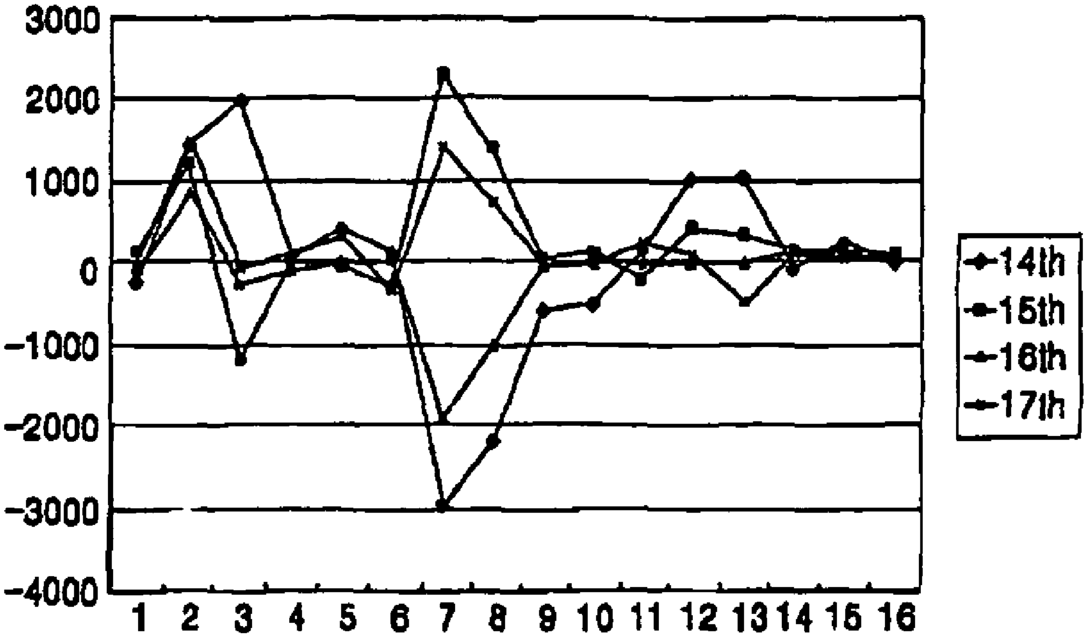

FIGS. 10A through 10E are illustrative waveforms of subbands for explaining a correlation between a low frequency band and a high frequency band. Specifically, FIG. 10A illustrates a sample size about 6th to 9th subbands, FIG. 10B illustrates a sample size about 10th to 13th subbands, FIG. 10C illustrates a sample size about 14th to 17th subbands, FIG. 10D illustrates a sample size about 18th to 21st subbands, and FIG. 10E illustrates a sample size about 22nd to 25th subbands. In each drawing, a horizontal axis represents time, and a vertical axis represents the size of a sample. 1 to 16 shown in each of FIGS. 10A through 10E represent indices on a time region.

If a reference frequency is the 10th subband of FIG. 10B, the size of a sample of an index 2 on a time region about the 14th subband of FIG. 10C in a high frequency band is very similar to the size of a sample of an index 2 on a time region about the 7th subband of FIG. 10A in a low frequency band, that is, correlation is very high.

As described above, in the apparatus and method for processing an audio signal using a correlation between bands according to the present invention, when the audio signal is encoded and decoded, a noise component is effectively substituted such that sound quality is improved, in particular, noise of a transient audio signal can be effectively substituted. Furthermore, without reducing a bandwidth even at a low bit rate, a high frequency signal can be effectively encoded and decoded, with respect to a signal having a strong harmonic component, more stable sound quality than in a conventional RNS method can be provided to the user, and when an audio signal with a large change according to time is processed, natural sound quality can be provided to the user.

In addition to the above-described exemplary embodiments, exemplary embodiments of the present invention can also be implemented by executing computer readable code/instructions in/on a medium, e.g., a computer readable medium. The medium can correspond to any medium/media permitting the storing and/or transmission of the computer readable code. The code/instructions may form a computer program.

The computer readable code/instructions can be recorded/transferred on a medium in a variety of ways, with examples of the medium including magnetic storage media (e.g., ROM, floppy disks, hard disks, etc.) and optical recording media (e.g., CD-ROMs, or DVDs). The medium may also be a distributed network, so that the computer readable code/instructions are stored and executed in a distributed fashion. The computer readable code/instructions may be executed by one or more processors.

Although a few exemplary embodiments of the present invention have been shown and described, it would be appreciated by those skilled in the art that changes may be made in exemplary embodiments without departing from the principles and spirit of the invention, the scope of which is defined in the claims and their equivalents.

What is claimed is:

1. An apparatus for processing an audio signal using a correlation between bands, the apparatus comprising:

an encoding unit encoding an input audio signal; and a decoding unit decoding the encoded input audio signal;

wherein the encoding unit comprises a correlation analyzer searching a most similar subband having a correlation of more than a predetermined value between first subband and the most similar subband in each of the first subbands from second subbands and generating information about the second searched subband, wherein the decoding unit comprises a high frequency component restoring portion copying data about the second searched subband as data about the first subband, using the generated information about the second subband generated by the correlation analyzer and transmitted in a bit stream format to perform decoding on the first subbands, and wherein the first subbands are subbands that belong to a high frequency band in a band of a result of subband-filtering the input audio signal and the second subbands are subbands that belong to a low frequency band in a band of the result of subband-filtering.

2. The apparatus of claim 1, wherein the encoding unit further comprises:

a subband filter analyzer subband-filtering the input audio signal and outputting the result of subband-filtering to the correlation analyzer;

a quantization portion quantizing the information about the second generated subband inputted from the correlation analyzer and the result of subband filtering; and an outputting portion lossless encoding and bit packing the result of quantization and transmitting a result of loss-encoding and bit-packing in a bit stream format to the decoding unit.

3. The apparatus of claim 2, wherein the encoding unit further comprises a quantization controller generating a step size control signal according to hearing sensitivity analyzed from the result of subband-filtering inputted from the subband filter analyzer and outputting the generated step size control signal to the quantization portion, and wherein the quantization portion adjusts a quantization step size in response to the step size control signal.

4. The apparatus of claim 2, wherein the decoding unit further comprises:

an inputting portion receiving a bit stream transmitted from the outputting portion, bit unpacking and lossless decoding the received bit stream, and extracting various information;

an inverse quantization portion inverse-quantizing a result of lossless encoding and outputting a result of inverse quantization to the high frequency component restoring portion; and a subband filter synthesizer subband-filtering the first subband having the copied data inputted from the high frequency component restoring portion and the result of inverse quantization and outputting a result of subband-filtering as an audio signal in which the input audio signal is restored, and wherein the high frequency component restoring portion copies data corresponding to information about the second generated subband included in the extracted information among data about the second subbands included in the result of inverse quantization, as data about the first subband.

5. The apparatus of claim 1, wherein the correlation analyzer comprises:

a correlation calculator discriminating the high frequency band and the low frequency band based on a reference frequency in a band of the result of subband-filtering and calculating correlations between the first subband and the second subbands in each of the first subbands that belong to the discriminated high frequency band;

a subband comparator and selector selecting a second subband used in calculating a largest correlation of more than the predetermined value among the correlations calculated in each of the first subbands; and an information generator generating information about the second selected subband, information about whether the first subbands have the similar subbands, and information about noise powers of the first subbands.

6. The apparatus of claim 5, wherein the subband comparator and selector comprises:

a subband selector selecting the second subband used in calculating the largest correlation among the correlations calculated in each of the first subbands; and a comparator comparing the correlations calculated using the second subbands selected in each of the first subbands with the predetermined value, and wherein the information generator generates information about the second selected subband in response to a result compared by the comparator.

7. The apparatus of claim 5, wherein the subband comparator and selector comprises:

a comparator comparing the correlations calculated in each of the first subbands with the predetermined value; and a subband selector selecting the second subband used in calculating the largest correlation among correlations of more than the predetermined value, in response to a result compared by the comparator, and wherein the information generator generates information about the second subband selected by the subband selector.

8. The apparatus of claim 5, wherein the high frequency component restoring portion comprises:

a correlation checking portion checking whether each of the first subbands has the similar subband;

a data copying portion copying data included in information about the second selected subband as data about the first subband in response to a checked result;

a random noise generator randomly generating noise about the first subband in response to the checked result; and a normalizing portion normalizing the copied data and the randomly-generated noise so that a total noise power about the first subband is maintained at the same level as that of the first subbands calculated from the encoding unit, and outputting a result of normalization.

9. The apparatus of claim 5, wherein the reference frequency is capable of being changed.

10. A method of processing an audio signal using a correlation between bands, the method comprising:

when encoding an input audio signal, searching a most similar subband having a correlation of more than a predetermined value between the first subband and the most similar subband in each of the first subbands from second subbands and generating information about the second searched subband; and when decoding the encoded input audio signal, copying data about the second searched subband as data about the first subbands, using the generated information about the second generated subband transmitted in a bit stream format to perform decoding on the first subband, and wherein the first subbands are subbands that belong to a high frequency band in a band of a result of subband-filtering the input audio signal and the second subbands are subbands that belong to a low frequency band in a band of the result of subband-filtering.

11. The method of claim 10, further comprising:

subband-filtering the input audio signal and proceeding the searching of the most similar subband and generating of the information about the second searched subband;

after the searching of the most similar subband and generating of the information about the second searched subband, quantizing the generated information about the second generated subband and the result of subband-filtering; and lossless encoding and bit packing the result of quantization and transmitting a result of loss-encoding and bit-packing in a bit stream format.

12. The method of claim 11, further comprising analyzing hearing sensitivity from the result of subband-filtering, and wherein, when quantizing the result of subband-filtering, adjusting a quantization step size according to an analyzed result.

13. The method of claim 11, further comprising:

receiving the transmitted bit stream, bit unpacking and lossless decoding the received bit stream, and extracting various information;

inverse-quantizing a result of lossless encoding and proceeding the copying of the data about the second searched subband as the data about the first subbands and performing decoding on the first subband; and after the copying of the data about the second searched subband as the data about the first subbands and performing decoding on the first subband, subband-filtering the first subband having the copied data and the result of inverse quantization and determining a result of sub-band-filtering as an audio signal in which the input audio signal is restored, and wherein, in the copying of the data about the second searched subband as the data about the first subbands and performing decoding on the first subband, data corresponding to information about the second generated subband included in the extracted information among data about the second subbands included in the result of inverse quantization is copied as data about the first subband.

14. The method of claim 10, wherein the searching of the most similar subband and generating of the information about the second searched subband comprises:

discriminating the high frequency band and the low frequency band based on a reference frequency in a band of the result of subband-filtering and calculating correlations between the first subband and the second subbands in each of the first subbands that belong to the discriminated high frequency band;

selecting a second subband used in calculating a largest correlation of more than the predetermined value among the correlations calculated in each of the first subbands;

generating information about the second selected subband and information about whether the first subband has the similar subband; and generating information about a noise power of the first subband.

15. The method of claim 14, wherein the selecting of the second subband comprises:

selecting the second subband used in calculating the largest correlation among the correlations calculated in each of the first subbands; and determining whether the correlation obtained using the second subband selected in each of the first subbands is more than the predetermined value, and wherein, if it is determined that the correlation is more than the predetermined value, generating the information about the second selected subband and information indicating that the first subband has the similar subband in the generating of information about the second selected subband.

16. The method of claim 14, wherein the selecting of second subband comprises:

determining whether there is correlation of more than the predetermined value among the correlations calculated in each of the first subbands; and if it is determined that there is correlation of more than the predetermined value, selecting the second subbands used in calculating the largest correlation among correlations of more than the predetermined value, and wherein information indicating that the first subband has no similar subband is generated.

17. The method of claim 14, wherein the correlation is obtained by $$cor = \frac{\text{abs}\left(\sum_{i=0}^{I-1}(samp[sb_1][i]\cdot samp[sb_2][i])\right)}{\sqrt{\sum_{i=0}^{I-1}(samp[sb_1][i]\cdot samp[sb_1][i])\sum_{i=0}^{I-1}(samp[sb_2][i]\cdot samp[sb_2][i])}}$$

wherein abs( )is an absolute value of ( ), $sb_1$ is an index of a second subband and is one selected from 0 to k−1, k is the number of second subbands that belong to a low frequency band, $sb_2$ is an index of the first subband, I is the number of time domain samples that belong to the first or second subbands, samp[$sb_i$][i] is an i-th time domain sample placed in an $sb_1$-th second subband, and samp[$sb_2$][i] is an i-th time domain sample placed in an $sb_2$ -th first subband.

18. The method of claim 14, wherein the copying of the data about the second searched subband as the data about the first subbands and performing decoding on the first subband comprises:

determining whether each of the first subbands has the similar subband;

if it is determined that each of the first subbands has the similar subband, copying data included in information about the second selected subband, as data about the first subband;

if it is determined that each of the first subbands has no similar subband, randomly generating noise about the first subband; and normalizing the copied data and the randomly-generated noise so that a total noise power about the first subband is maintained at the same level as that of the first subbands calculated in encoding the input audio signal.

19. At least one computer readable medium storing instructions that control at least one processor to perform a method of processing an audio signal using a correlation between bands, the method comprising:

when encoding an input audio signal, searching a most similar subband having a correlation of more than a predetermined value between the first subband and the most similar subband in each of the first subbands from second subbands and generating information about the second searched subband; and when decoding the encoded input audio signal, copying data about the second searched subband as data about the first subbands, using the generated information about the second generated subband transmitted in a bit stream format to perform decoding on the first subband, and wherein the first subbands are subbands that belong to a high frequency band in a band of a result of subband-filtering the input audio signal and the second subbands are subbands that belong to a low frequency band in a band of the result of subband-filtering.

20. A method of processing an audio signal using a correlation between bands, the method comprising:

encoding an input audio signal including searching second subbands for a most similar subband having a correlation of more than a predetermined value between the first subband and the most similar subband in each of the first subbands, and generating information about the most similar subband; and decoding the encoded input audio signal including copying data about the second searched subband as data about the first subbands, using the generated information about the second generated subband transmitted in a bit stream format to perform decoding on the first subband, wherein the first subbands are subbands that belong to a high frequency band, and the second subbands are subbands that belong to a low frequency band.

21. At least one computer readable medium storing instructions that control at least one processor to perform a method of processing an audio signal using a correlation between bands, the method comprising:

encoding an input audio signal including searching second subbands for a most similar subband having a correlation of more than a predetermined value between the first subband and the most similar subband in each of the first subbands, and generating information about the most similar subband; and decoding the encoded input audio signal including copying data about the second searched subband as data about the first subbands, using the generated information about the second generated subband transmitted in a bit stream format to perform decoding on the first subband, wherein the first subbands are subbands that belong to a high frequency band, and the second subbands are subbands that belong to a low frequency band.

22. An audio encoding apparatus comprising:

a subband filter analyzer to subband-filter an input audio signal;

a correlation analyzer to search a most similar subband having a correlation of more than a predetermined value between a first subband and the most similar subband in each of the first subbands from second subbands and to generate information about the second searched subband; and a quantization portion to quantize information about the second generated subband inputted from the correlation analyzer and the result of subband filtering, wherein the first subbands are subbands that belong to a high frequency band in a band of a result of subband-filtering the input audio signal and the second subbands are subbands that belong to a low frequency band in a band of the result of subband-filtering.

23. An audio decoding apparatus comprising:

an inputting portion to receive a bitstream including information about a most similar subband having a correlation of more than a predetermined value between a first subband and the most similar subband in each of the first subbands from second subbands, to bit unpack and to lossless decode the received bitstream;

an inverse quantization portion to inverse-quantize a result of lossless encoding and to output a result of inverse quantization;

a high frequency component restoring portion copies data corresponding to information about the second generated subband included in information extracted among data about the second subbands included in the result of inverse quantization, as data about the first subband; and a subband filter synthesizer to subband-filter the first subband having the copied data inputted from the high frequency component restoring portion and the result of inverse quantization and to output a result of subband-filtering as an audio signal in which the input audio signal is restored, wherein the first subbands are subbands that belong to a high frequency band in a band of a result of subband-filtering the input audio signal and the second subbands are subbands that belong to a low frequency band in a band of the result of subband-flitering.

* * * * *

UNITED STATES PATENT AND TRADEMARK OFFICE

CERTIFICATE OF CORRECTION

PATENT NO. : 7,756,715 B2
APPLICATION NO. : 11/280196
DATED : July 13, 2010
INVENTOR(S) : Junghoe Kim et al.

It is certified that error appears in the above-identified patent and that said Letters Patent is hereby corrected as shown below:

Column 14, Line 38, in Claim 17, delete “abs( )is” and insert --abs( ) is--, therefor.

Column 14, Line 43, in Claim 17, delete “samp[$sb_i$][i]” and insert --samp[$sb_1$][i]--, therefor.

Column 16, Line 48, in Claim 23, delete “flitering” and insert --filtering--, therefor.

Signed and Sealed this
Fifth Day of April, 2011

David J. Kappos
*Director of the United States Patent and Trademark Office*